US005287612A

United States Patent [19]

Paddock et al.

[11] Patent Number: 5,287,612

[45] Date of Patent: Feb. 22, 1994

[54] APPARATUS FOR REMOVAL OF A BEARING FRAME ASSEMBLY

[75] Inventors: Douglas Paddock, Penn Yan; Peter J. Ruzicka, Auburn; George Wilson, Skaneateles, all of N.Y.

[73] Assignee: Goulds Pumps, Incorporated, Seneca Falls, N.Y.

[21] Appl. No.: 842,487

[22] Filed: Feb. 27, 1992

[51] Int. Cl.[5] .............................................. B23Q 3/00

[52] U.S. Cl. .................................... 29/256; 29/281.4; 29/281.5; 269/46

[58] Field of Search .................... 269/17, 46; 254/100, 254/134, DIG. 16; 294/67.21, 67.22, 67.2; 29/256-262, 273, 266, 281.4, 281.5

[56] References Cited

U.S. PATENT DOCUMENTS

| | | | |
|---|---|---|---|
| 1,195,518 | 8/1916 | Simpson et al. . | |
| 1,471,559 | 10/1923 | Knauf . | |
| 2,947,260 | 8/1960 | Hornschuch . | |
| 3,220,565 | 11/1965 | Wells | 254/134 |
| 3,338,556 | 8/1967 | Sluse | 254/134 |
| 3,659,964 | 5/1972 | Dahlgren . | |
| 3,709,547 | 1/1973 | Nutter . | |
| 3,749,437 | 7/1973 | Lynn . | |
| 3,771,915 | 11/1973 | Back . | |
| 3,843,185 | 10/1974 | James et al. . | |
| 3,851,857 | 12/1974 | Notgrass | 254/DIG. 16 |
| 3,880,553 | 4/1975 | Wolford et al. . | |
| 4,283,828 | 8/1981 | Coles | 29/256 |
| 4,324,531 | 4/1982 | Sarvanne . | |
| 4,365,786 | 12/1982 | Osteen . | |
| 4,691,904 | 9/1987 | Armstrong | 254/DIG. 16 |
| 4,722,106 | 2/1988 | Scegiel et al. . | |
| 5,135,205 | 8/1992 | Bedard | 269/17 |

*Primary Examiner*—Robert C. Watson

*Attorney, Agent, or Firm*—Brezina & Ehrlich

[57] ABSTRACT

An apparatus for attachment to an overhead crane for removing the bearing assembly from a vertical centrifugal pump system without removing the motor. The apparatus includes a rigid C-shaped frame which is attached by a pulley to an overhead crane and also includes a pivotal attachment on the opposite end of the frame which is removably connected to the bearing assembly. Intermediate and vertically aligned with the ends of the frame is a horizontal displacement control member which is removably connected to the bearing assembly at a point vertically above the pivotal attachment. Horizontal displacement of the horizontal displacement control member will cause a rotating of the bearing assembly about the pivotal attachment allowing clearance and lateral removal of the bearing assembly from the vertical pump system.

10 Claims, 3 Drawing Sheets

APPARATUS FOR REMOVAL OF A BEARING FRAME ASSEMBLY

FIELD OF THE INVENTION

The present invention relates to an apparatus and method for safely removing and replacing an element intermediate a vertical centrifugal pump casing and an electric motor in a vertical centrifugal pump system without requiring removal of the electric motor.

BACKGROUND OF THE INVENTION

In many industries, a vertical centrifugal pump system is employed. This type a pump system normally includes a centrifugal pump casing at the bottom of the system, an electric motor at the top, and a bearing assembly intermediate to and vertically connecting the motor and the pump. To repair the bearing assembly and/or impeller of the pump, it is necessary to remove the bearing assembly from the pump system. This removal can be accomplished by first removing the electric motor and then removing the bearing assembly. Removing and reinstalling the electric motor, however, significantly lengthens the time necessary to service the bearing assembly because the electric motor must be carefully reinstalled so that the axis of the electric motor is properly aligned with the axis of the pump. This reinstallation is frequently a trial and error technique whereby shims are placed under the flange of the motor mount and the shaft is measured for alignment. A second disadvantage of this method is that removal of the electric motor will typically require the services of an electrician in addition to the pump mechanic, which increases the repair expense and poses a scheduling problem for the servicing of the bearing assembly. A third disadvantage of this method is failure to disconnect the electric motor from power supply presents a potential for injury due to an inadvertent starting of the motor or a shock hazard.

Because of the above considerations, the best method for removal and replacement of the bearing assembly is a method which would allow the bearing assembly to be horizontally or laterally removed from the pump system. To allow this horizontal movement, however, the impeller which is attached to the bottom part of the bearing assembly must clear the top of the pump casing. If there is insufficient clearance between the top end of the bearing assembly shaft and the bottom end of the electric motor shaft to allow the impeller to clear the pump casing, it is necessary to pivot or rotate the bearing assembly. A typical bearing assembly, however, is bulky and has a substantial weight. Therefore, a mechanic must employ mechanical means to accomplish this lifting and rotation of the bearing assembly. However, because of the substantial weight, this lifting and rotation poses a safety issue to the personnel involved. In addition the bearing assembly can be damaged during removal or installation if not handled properly.

In the typical work environment where these vertical pump systems are found, the most available mechanical means for servicing the pump systems include overhead cranes, "cherry pickers", forklifts and tripods with chain hoists. As these devices can only lift in a vertical direction, they lack the ability to lift and pivot or rotate the bearing assembly without removal of the electric motor.

SUMMARY OF THE INVENTION

A general object of the present invention, therefore, is to provide a novel apparatus to allow an operator to use a vertical lifting device to remove and handle a bearing assembly in a vertical centrifugal pump system without requiring the removal of the electric motor.

A further and related object is to provide such an apparatus to safely control the handling of the bearing assembly during the removal and replacement process.

A still further object is to provide such an apparatus which can be readily operated by one person.

A still further object is to provide an apparatus which has few moving parts but is highly movable and does not require specialized machinery in its use.

A still further object is to allow the operator to remove and install the bearing assembly while minimizing the possibility of damage to the bearing assembly during the removal and installation procedure.

Thus, in accordance with a preferred embodiment of the invention, the proposed vertical pump bearing assembly removal apparatus includes a rigid frame having an elongated vertical member and upper and lower horizontal members joined to and projecting laterally from one side of the vertical member, thereby providing the frame with a somewhat C shaped profile. The outer end of the upper horizontal member is connected to a pulley or other lifting apparatus which, in turn, is connected to an overhead crane. The lifting apparatus and overhead crane are adapted to be controlled by the operator. Connected to the lower horizontal member is a pivot attachment which is adapted to be removably attached to the bearing assembly. The pivotal attachment allows the bearing assembly to be pivoted about the end of the lower horizontal member so that the upper portion of the bearing assembly can be rotated in a direction toward the vertical member.

Intermediate the upper and lower horizontal members of the frame is a horizontal displacement control device which in the preferred embodiment comprises a rod which horizontally passes through an opening in the vertical member and is vertically aligned and generally parallel with the upper and lower horizontal members. On an end of the rod portion is a hook or rotatable connector which can be removably connected to the upper portion of the bearing assembly at a point vertically above the pivotal attachment. The rod is threaded over its length. The opposite end portion of the rod which passes through the vertical member includes a nut sized for threaded movement over the threaded rod and the nut is abutting the side of the vertical member opposite the bearing assembly. The operator can use a common wrench to rotate the nut to cause horizontal displacement of the rod, thereby causing a corresponding horizontal displacement of the upper portion of the bearing assembly to which the hook portion of the rod is connected. This displacement of the upper portion of the bearing assembly will cause the bearing assembly to pivot about the pivot point.

The generally C-shaped configuration of the frame allows the operator to use an overhead crane to position the attachment point of the apparatus to the crane vertically above the electric motor to allow removal of the bearing assembly. The operator next connects the pivot attachment and hook portion of the horizontal displacement control member to the bearing assembly. Then, by using the overhead pulley and rotating the nut on the horizontal displacement control member, the operator lifts and pivots the bearing assembly, thus removing the bearing assembly from within the confines of the pump system without removing the overhead electric motor.

Other objects and purposes of the invention will become clear from the following drawings and detailed description of the preferred embodiment.

DETAILED DESCRIPTION OF THE PREFERRED EMBODIMENT

Figure 1:
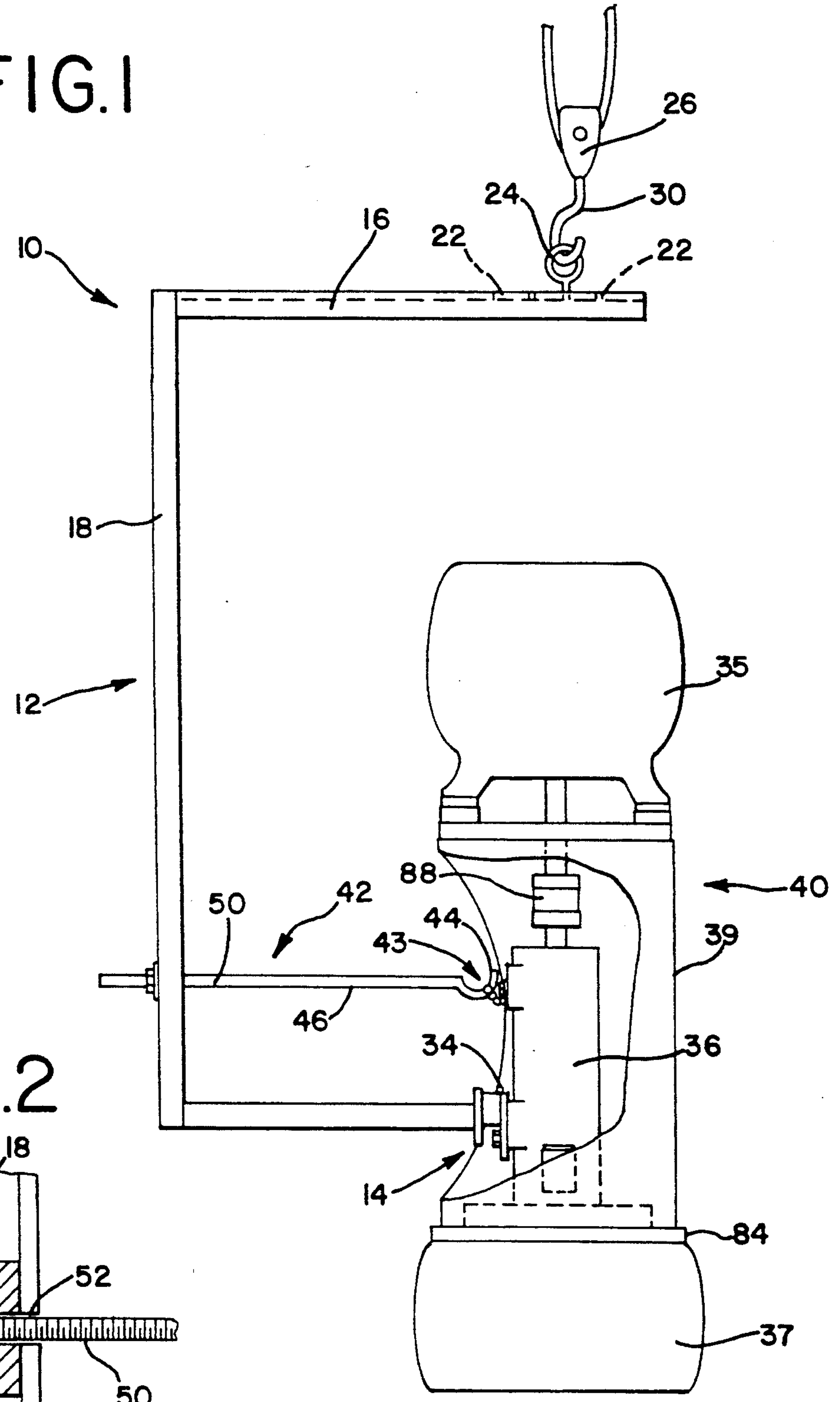
FIG. 1 is an elevation view of the removal device of the present invention attached to an overhead pulley and bearing assembly.

Referring to FIG. 1 which shows the preferred embodiment of the novel invention, indicated generally at 10 is a vertical pump bearing assembly removal apparatus as contemplated herein. The apparatus 10 includes a rigid frame indicated generally at 12 and a pivotal attachment portion indicated generally at 14. A vertical centrifugal pumping apparatus is shown generally at 40. The pumping apparatus 40 includes a vertical pump bearing assembly 36, an electric motor 35 and centrifugal pump casing or body 37. The electric motor 35 is mounted on a motor support 39 which partially encloses the bearing assembly 36.

The rigid frame 12 includes an upper horizontal member 16, a vertical member 18 and a lower horizontal member 20. The upper horizontal member 16 and lower horizontal member 20 are rigidly connected to the vertical member 18, preferably by welding or other suitable means, and extend horizontally from one side of the vertical member. The frame 12 is thus generally C-shaped. The upper horizontal member 16, vertical member 18 and lower horizontal member 20 are preferably constructed of steel angle iron having a C shaped cross section commonly referred to as channel steel. However, the members could be made of any type of elongated member which resist a torque applied about a horizontal axis.

Figure 5:
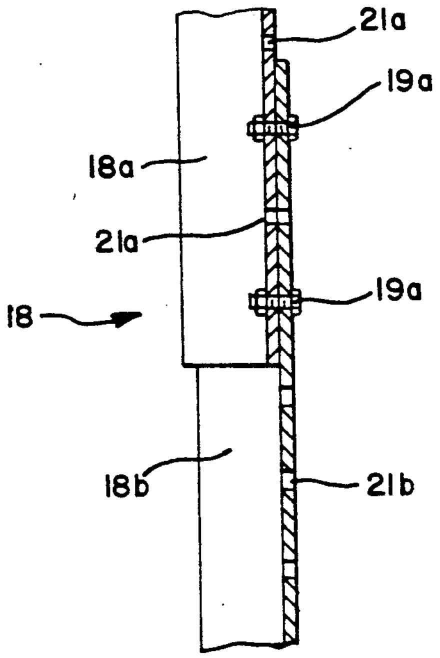
FIG. 5 is a partial sectional view of an alternate embodiment of the vertical member of the rigid frame.

Although the preferred embodiment of the present invention contemplates the vertical member 18 being a single piece, an alternate embodiment of the vertical member includes an upper and a lower vertical member **18*a* and 18*b* which are adapted so that lower vertical member 18*b* slides within upper vertical member 18*a* as shown in FIG. 5. The two members are adjustably connected by bolt connectors 19*a* which pass through a first series of equally spaced holes 21*a* on the upper vertical member 18*a* and a second series of holes 21*b* on lower vertical member 18*b* which are spaced and dimensioned equally to the first series of holes. Should the operator need to vary the vertical height of the removal apparatus 10 because of varying heights of different vertical centrifugal pumping apparatus 40 or vertical clearance constraints, the operator slides the lower vertical member 18*b* within the upper vertical member 18*a* until the vertical member 18 is of the desired height and the holes 21*a* on the upper vertical member 18*a* are aligned with the holes 21*b* on the lower vertical member. The operator then rigidly connects the upper vertical member 18*a* to the lower vertical member 18*b* using the bolt connectors 19*a***.

Along the upper face of a portion of the upper horizontal member 16 opposite the connection to vertical member 18 is an upper series of spaced holes 22. These holes 22 allow a lifting eye 24 to be attached at various locations along the length of the upper horizontal member 16. The lifting eye 24 allows the removal apparatus 10 to be connected to an overhead crane or the like (not shown) by a lifting apparatus 26 such as a conventional pulley arrangement and a lifting hook 30, as shown.

Figure 3:
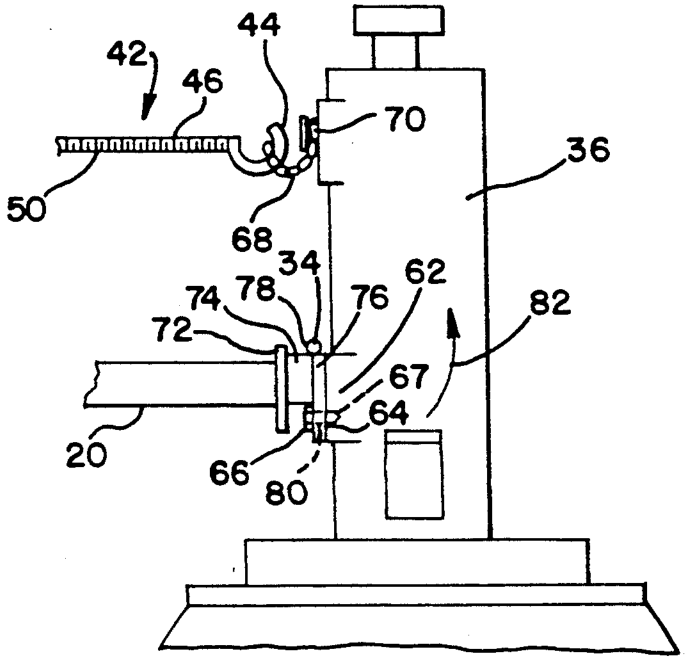
FIG. 3 is a partial elevation view of the removal device connected to the bearing assembly.

At the end of the lower horizontal member 20 opposite the attached vertical member 18 is the pivotal attachment 14. As illustrated in FIGS. 1 and 3, the pivotal attachment 14 is removably attached to a lower portion of the vertical pump bearing assembly 36, as explained in more detail below. The pivotal attachment 14 allows the pivoting of the bearing assembly 36 about a pivoting point 34.

Figure 2:
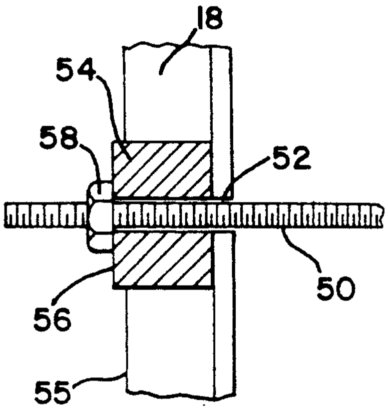
FIG. 2 is a partial sectional view of the connection of the horizontal displacement control member and the vertical member of the rigid frame.

The removal apparatus 10 also includes a horizontal displacement control member or force means indicated generally at 42. The control member 42 includes a rotatable connector 43 integral with a horizontal rod 46. The preferred embodiment of the rotatable connector 43 is a hook portion 44 as shown in FIG. 1. Opposite the rotatable connector 43, the horizontal rod 46 includes a threaded portion 50 which extends preferably the length of the rod 46. As seen in FIG. 2, the threaded portion 50 horizontally extends through an aperture 52 defined by the vertical member 18 and a spacer block 54. The spacer block 54 is rigidly attached to the vertical member 18 preferably by welding or other suitable means and is situated between the flanges 55 of the C-shaped channel steel. The spacer block 54 is of a thickness so that an outer face 56 of the spacer block 54 extends beyond the flanges 55 of the channel steel forming vertical member 18. A nut 58 sized for threaded movement over the threaded end portion 50 of the rod 46 abuts the outer face 56 of the spacer block 54. Having the nut 58 outside the flanges of the vertical member 18 allows the operator to easily rotate the nut using conventional tools. If desired, a washer can be placed between the nut 58 and spacer block 54.

As shown in FIG. 3, the bearing assembly 36 includes a back pull-out assembly 62 having a flat surface 64 and a pair of horizontally aligned threaded bolt holes 67. Vertically disposed from the back pullout assembly 62 is a chain 68 connected to the upper portion of bearing assembly 36 preferably by a pair of horizontally aligned bolts 70 inserted into mating bolt holes 71. The hook portion 44 of the horizontal displacement control apparatus 42 is hooked onto a loop formed by chain 68. Although the drawings indicate the hook portion 44 is removably connected to the bearing assembly 36 at a point vertically aligned with the back pullout assembly 62, the connection can be at locations displaced laterally somewhat from the illustrated location without effecting the operation of the removal apparatus 10.

Referring again to FIG. 3, the preferred embodiment of the pivot attachment 14 includes a first plate 72 fixedly connected to the lower horizontal member 20, a hinge block 74 fixedly connected to the first plate member 72, and a second plate 76 which is pivotally connected to the hinge block 74 with a conventional hinge 78 and pivots about the pivot point 34. The hinge 78 is fixedly connected to and runs horizontally along the top surface of the hinge block 74 and second plate 76. The hinge 78 allows the second plate member 76 to pivot relative to the hinge block 74 about the pivot point 34. Second plate 76 includes two bolt holes 80 which are sized and aligned to allow the second plate member 76 to be securely connected to the back pull-out assembly 62 of bearing assembly 36 by inserting bolts 66 through bolt holes 80 and into threaded bolt holes 67. The bolt holes 80 pass through the second plate member 76 below the bottom face of the hinge block 74 so the bolt connection can be easily made by the operator. In the preferred embodiment, the hinge 78 is connected to the hinge block 74 and second plate 76 so that the hinge block is in a flush, abutting relationship with the second plate. Therefore, when the hinge block 74 and second plate 76 are properly aligned, the second plate 76 can only pivot in a counterclockwise direction, as indicated at 82, relative to the hinge block 74.

Figure 6:
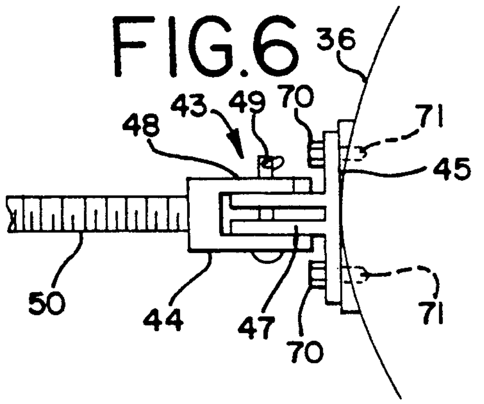
FIG. 6 is a partial top plan view of an alternate embodiment of a removable connector connecting the horizontal rod to the bearing assembly.

An alternate embodiment of the rotatable connector 43 is shown in FIG. 6. The rotatable connector 43 includes a first bracket 44 integrally connected to the threaded portion 5 of the horizontal rod 46 and having an outer pair of ears 48. A second bracket 45 having an inner pair of ears 47 is boltedly connected to the bearing assembly 36 using bolts 70 which are inserted into the mating bolt holes 71. The outer pair of ears 48 of the first bracket 44 are adapted to be rotatably connected to the inner pair of ears 47 of the second bracket 45 with a removable pin 49.

Figure 7:
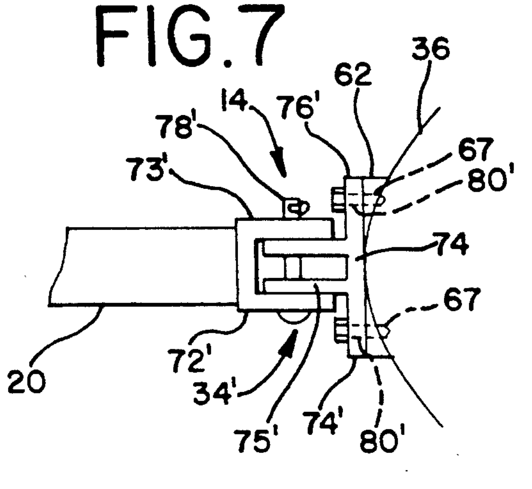
FIG. 7 is a partial top plan view of an alternate embodiment of the pivotal attachment connected to the bearing assembly.

An alternate embodiment of the pivot attachment 14 is shown in FIG. 7. The pivot attachment includes a first bracket 72' having an outer set of ears 73' and a second bracket 74' having an inner set of ears 75' and a second plate 76'. The second bracket 74' is adapted to be connected to the back pullout assembly 62 of the bearing assembly 36 by bolts 66 which pass through bolt holes 80' in the second plate 76' and into the threaded holes 67 in the back pullout assembly. The outer set of ears 73' is hingeably connected to the inner set of ears 75' by a removable pin 78'. The removable pin 78' allows the second bracket 74' to pivot relative to the first bracket 72' about a pivot point 34'.

To employ the removal apparatus 10 to remove the bearing assembly 36 from the vertical centrifugal pumping apparatus 40, the operator will first attach the lifting eye 24 to one of the holes 22 in the upper horizontal member 16 of frame 12. The operator then selects the proper upper hole 22 whereby the attachment point will be vertically above the center of gravity of the removal apparatus 10 and the connected bearing assembly 36. This will minimize any undesirable rotational movement of the removal apparatus 10 during the vertical displacement and rotation of the bearing assembly 36 as described herein. The operator then connects the removal apparatus 10 to the overhead crane (not shown) by placing the lifting hook 30 through the lifting eye 24. By using the operator controlled overhead crane control and pulley 26, the operator can vertically position the removal apparatus 10 and align the bolt holes 80 on the second plate 76 with the threaded bolt holes 67 on the back pullout assembly 62 of the bearing assembly 36. The operator then securely connects the second plate member 76 to the back pullout assembly 62 using bolts 66.

The operator then disconnects the pump bearing assembly 36 from a spacer coupling 88 and the centrifugal pump casing 37. Should the spacer coupling 88 provide sufficient clearance between the bearing assembly 36 and the electric motor 35, the operator uses the pulley 26 to vertically and upwardly displace the assembly removal apparatus 10, causing a corresponding vertical upward displacement of the bearing assembly 36. Because the hinge block 74 and second plate 76 of the pivotal attachment 14 are in a flush, abutting relationship, the bearing assembly 36 will not pivot about the pivot point 34 upon the vertical displacement of the bearing assembly. Also, the horizontal displacement control apparatus 42 provides a rigid connection between frame 12 and bearing assembly 36, further preventing the bearing assembly from pivoting. The operator continues to vertically displace the removal apparatus 10 and bearing assembly 36 until the bottom of the bearing assembly 84 and impeller 86 (FIG. 4) clear the centrifugal pump casing 37. The operator then manipulates the overhead crane to horizontally move the removal apparatus 10, thus removing the bearing assembly 36 from the pumping apparatus 40. The operator then moves the bearing assembly 36 to desired location for servicing.

Figure 4:
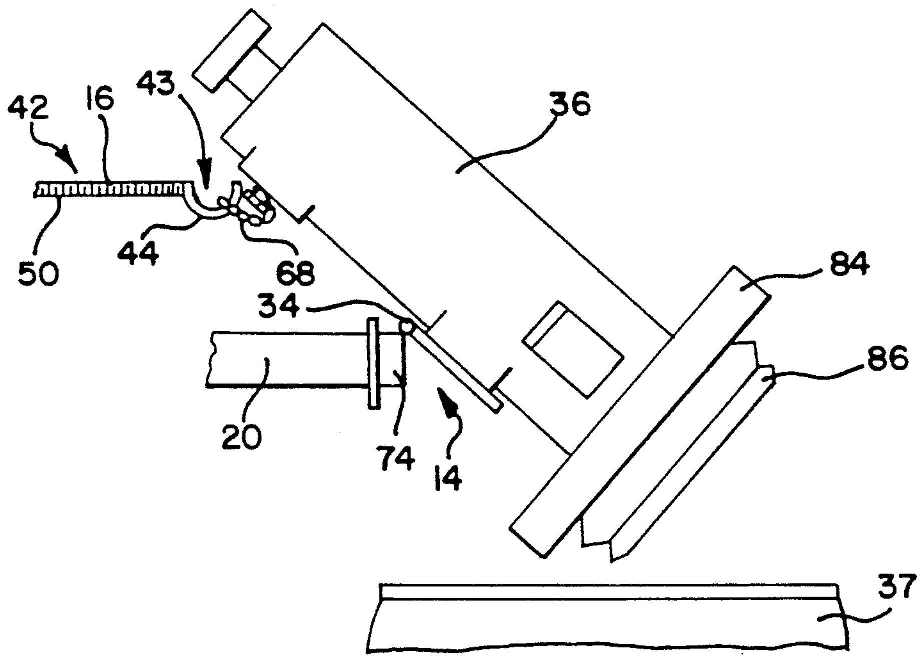
FIG. 4 is a partial elevation view of the rotation of the bearing assembly by the removal device according to the workings of the present invention.

After disconnecting the spacer coupling 88, should the clearance between the top of the bearing assembly 36 and the electric motor 35 be insufficient to allow the necessary vertical displacement to remove the bearing assembly 36 using the above-described technique, the operator securely connects the pivot attachment 14 to the bearing assembly 36 and inserts the hook portion 44 of the horizontal displacement control member 42 through the loop formed by chain 68. The operator then uses a conventional wrench or the like to rotate the nut 58. The turning of the nut 58 forces a controlled horizontal displacement of the hook portion 44 in a direction toward the vertical member 18. The hook portion 44 then causes a corresponding horizontal displacement of the chain 68 and the upper portion of bearing assembly 36, thereby controlledly pivoting the bearing assembly 36 about the pivot point 34, as illustrated in FIG. 4. The operator can combine the described pivoting technique with the vertical displacement technique using the overhead crane as described earlier to obtain the proper clearance between the top of the bearing assembly 3 and the motor 35, and between the bottom 84 of the bearing assembly and impeller 86 and the pump casing 37 of the centrifugal pumping apparatus 40. The operator next manipulates the overhead crane to horizontally displace the removal apparatus 10, thereby removing the bearing assembly 36 from the pumping apparatus. The operator then moves the bearing assembly 36 to the desired location for servicing.

To install the bearing assembly 36, the above steps are reversed.

A specific embodiment of the novel apparatus and method for removal of a bearing frame assembly according to the present invention has been described for the purposes of illustrating the manner in which the invention may be made and used. It should be understood that implementation of other variations and modifications of the invention in its various aspects will be apparent to those skilled in the art and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. An apparatus for safely removing a bearing assembly from a vertical pump system comprising:

an elongated upright rigid frame; pivot attachment means removably connected between said frame and said bearing assembly defining a pivot point having a general horizontal axis proximate said bearing assembly; force means removably attached to an upper portion of said bearing assembly at a position vertically disposed of said pivot point; said force means applying force to said assembly to rotate said assembly about said pivot point and clear remaining portions of said vertical pump system.

2. The apparatus of claim 1 wherein said pivot attachment means is rigidly connected to said frame and is removably attached to said bearing assembly.

3. The apparatus of claim 1 wherein said force means includes horizontal displacement means removably connected to the bearing assembly and having means for controlling the rotation of said bearing assembly about said pivot point.

4. The apparatus of claim 3 wherein said horizontal displacement means includes a rod having a connector for removable connection to an element on the upper portion of said bearing assembly, and having a threaded portion horizontally passing through an aperture in said rigid frame, said rotation control means including a nut sized for threaded movement along said threaded portion and abutting said frame opposite said bearing assembly whereby rotation of said nut causes horizontal displacement of said rod whereby said bearing assembly rotates about said pivot point.

5. The apparatus of claim 4 wherein said rigid frame includes a spacer block rigidly connected to said vertical member, said vertical member and said spacer block defining a horizontal elongated aperture for acceptance of said threaded portion of said rod.

6. The apparatus of claim 1, wherein said frame includes a vertical member, an upper generally horizontal member rigidly connected to one side of an upper end portion of said vertical member, and a lower generally horizontal member rigidly connected to the one side of a lower end portion of said vertical member, said lower generally horizontal member extending generally parallel to said upper generally horizontal member.

7. The apparatus of claim 6 wherein said pivot attachment means is connected at an end of said lower generally horizontal member and opposite the connection of said lower generally horizontal member to said vertical member.

8. The apparatus of claim 1 wherein said pivot attachment means comprises a hinge block securely connected to said rigid frame, a second plate pivotally connected to said hinge block, said second plate being removably connected to said bearing assembly.

9. The apparatus of claim 8 wherein said second plate and said hinge block are adapted to allow said second plate to rotate in only one direction from a vertical position.

10. The apparatus of claim 1 wherein said pivot attachment means includes means to allow the bearing assembly to rotate in only one direction from a vertical position.

* * * * *